Patented Mar. 21, 1950

2,500,942

UNITED STATES PATENT OFFICE 2,500,942

ETHERS OF BETA-HYDROXYADIPONITRILE

Glenn F. Hager, Wilmington, Del., assignor to E. I. du Pont de Nemours & Company, Wilmington, Del., a corporation of Delaware No Drawing. Application April 13, 1948, Serial No. 20,830

6 Claims. (Cl. 260—465.6)

This invention relates to a new class of organic nitriles. More particularly, it relates to certain new nitriles having ether groups.

Adiponitrile is a highly important industrial chemical, since it is the starting material for the preparation of many compounds, including hexamethylenediamine, one of the principal components of nylon. Substituted adiponitriles are of considerable scientific and technical interest, per se or as precursors of a large number of compounds with diverse properties. Unfortunately, few substituted adiponitriles are available for study. In particular, there is no report in the literature of any adiponitrile having ether substituents, e. g., having alkoxy, aryloxy, cycloalkyloxy, etc., substituents, in spite of the fact that ether-substituted adiponitriles would open the way for further advances in many fields of chemistry.

It is an object of this invention to prepare new organic nitriles. A further object is to prepare new nitriles having ether groups. A still further object is to prepare new ether-substituted adiponitriles. Other objects will appear hereinafter.

Those objects are accomplished by providing new compositions of matter having the general formula

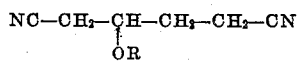

wherein R is the non-hydroxyl portion of an alcohol. This invention makes available a new class of chemical compounds which include the aliphatic ethers of beta-hydroxyadiponitrile.

The ethers of beta-hydroxyadiponitrile are prepared in excellent yields by reacting under anhydrous conditions and in the presence of catalytic amounts of an alkali metal alkoxide or hydroxide, 1,4-dicyano-2-butene or its isomer, 1,4-dicyano-1-butene, with an alcohol. The reaction is represented by the equation:

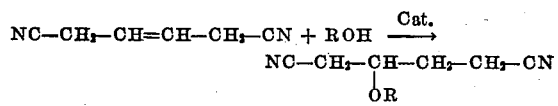

The starting material, 1,4-dicyano-2-butene, may be prepared, for example, by the method described in U. S. 2,342,101, or by the improved methods described in a number of recently filed applications such as Ser. No. 768,283 (Whitman, August 12, 1947), now Patent #2,477,674; Ser. No. 768,703 (Hager, August 14, 1947), now Patent #2,477,597; or Ser. No. 768,705 (Farlow, August 14, 1947). The isomeric 1,4-dicyano-1-butene may be conveniently prepared by isomerization of 1,4-dicyano-2-butene in the presence of a hydrogenating metal such as copper or cobalt at elevated temperature, e. g., between 60 and 150° C., as described in application Ser. No. 756,097, filed by Hager on June 20, 1947, now Patent #2,451,386. Either dicyanobutene can be used separately, or their mixtures can be used.

The reaction is preferably carried out by dissolving catalytic amounts of an alkali metal, i. e., lithium, sodium, potassium, cesium or rubidium, in the alcohol to be reacted with the dicyanobutene. The latter is then added to the solution and the reaction is allowed to proceed. Instead of the alkali metal alkoxide, there may be used an equivalent amount of alkali metal hydroxide. There may also be used, though less successfully, an alkali metal carbonate or ammonium carbonate. The reaction is spontaneous and takes place readily at low temperature, e. g. within the range between —10° C. and 50° C. With the less reactive alcohols the temperature may be raised, for example, up to 150° C. or even more if desired.

The two reactants need be used only in substantially equimolar proportions, but in general it is preferable to use an excess of the alcohol, e. g., between 0.1 mole and 30 moles excess, to insure complete reaction of the dicyanobutene which is in general the more expensive reactant. The alkali metal alkoxide or hydroxide catalyst need only be used in minute amounts, e. g., within the range between 0.001 mole and 0.5 mole per mole of dicyanobutene, although more can be used if desired. In the event the alkali metal is not readily soluble in the alcohol to be reacted, it may be dissolved in a small amount of another alcohol such as methanol or ethanol and this solution may be used as the catalyst. If mixed ethers are desired, two or more alcohols may be reacted simultaneously with the dicyanobutene. The presence of any substantial amount of water in the reaction mixture is to be avoided since it tends to form by-products and decrease the yields.

The reaction is in general substantially complete within a period of one to two hours at ordinary temperature, but no damage is done by prolonging it for longer periods such as 16-24 hours, or by heating the reaction mixture. The ethers of beta-hydroxyadiponitrile may be isolated by any conventional method such as fractional distillation or removal of the excess alcohol, if any, followed by crystallization if the product is a solid. It is often desirable to acidify the reaction mixture prior to isolation to prevent possible decomposition of the reaction product by the alkali at elevated temperature.

Various ethers of beta-hydroxyadiponitrile are illustrated in the following examples, in which parts are by weight.

Example I

One-half part of sodium was dissolved in 800 parts of methanol and 400 parts of 1,4-dicyano-2-butene was added with stirring. The temperature dropped initially and after a short period rose to 45° C. The reaction mixture was stirred for 6 hours and then allowed to stand for 24 hours. After removal of a considerable proportion of the excess methanol by evaporation under reduced pressure below 50° C. the residue was treated with 300 parts of water and made slightly acid with hydrochloric acid. The organic layer was washed with another 300 parts of water, and the water layers were extracted with chloroform and added to the organic layer. The combined organic layers were dried over sodium sulfate, filtered and distilled. Four hundred and forty-two parts (86% of the theoretical yield) of beta-methoxyadiponitrile were obtained, boiling at 109-123° C. at a pressure of 0.3-1.2 mm. of mercury. It had a refractive index $n_D^{25}$ of 1.4451.

Analysis: Calculated for $C_7H_{10}ON_2$; C, 60.9; H, 7.3. Found: C, 61.5; H, 7.3.

Example II

One-quarter part of sodium was dissolved in 500 parts of absolute ethanol and 200 parts of 1,4-dicyano-2-butene was added with stirring. After stirring for several hours, the reaction mixture was allowed to stand for 24 hours and the excess alcohol was removed by distillation under reduced pressure. The residue was washed in 200 parts of water containing sufficient hydrochloric acid to make the reaction mixture slightly acid. It was then washed with 200 parts of water. The aqueous washings were extracted with chloroform and the extracts added to the product layer. The product layer was dried over sodium sulfate, filtered and distilled. Two hundred and fourteen parts of beta-ethoxyadiponitrile (74.5% yield) was obtained boiling at 111-117° C. at a pressure of 0.25 mm. of mercury. This material had a refractive index $n_D^{25}$ of 1.4417.

Analysis: Calculated for $C_8H_{12}ON_2$; C, 63.6; H, 7.95. Found: C, 63.64; H, 7.87.

Example III

One-quarter part of sodium was dissolved in 55.5 parts of isobutanol and 53 parts of cis-1,4-dicyano-1-butene was added with stirring at room temperature over a period of 1½ hours. After the reaction mixture was allowed to stand for 16 hours, it was washed in water containing sufficient hydrochloric acid to neutralize the sodium. It was washed again with water and evaporated under reduced pressure on a steam bath. Distillation of the residue yielded 62.1 parts (70% of the theoretical amount) of beta-isobutoxyadiponitrile boiling at 109-121° C. at a pressure of 0.12-0.16 mm. of mercury. The product had a refractive index $n_D^{25}$ of 1.4435.

Analysis: Calculated for $C_{10}H_{16}ON_2$; N, 15.55. Found: N, 15.99%.

Example IV

One-half part of sodium was dissolved in 85 parts of 2-ethylhexanol and 53 parts of 1,4-dicyano-1-butene was added slowly over a period of 1¾ hours while the reaction was kept at a temperature of 5-10° C. After stirring for an additional ½ hour, the reaction mixture was washed with dilute hydrochloric acid and distilled. The resulting beta-2-ethylhexyloxyadiponitrile had a boiling point of 154-161° C. at a pressure of 0.2-0.5 mm. of mercury.

Example V

One-half part of sodium was dissolved in 37.7 parts of allyl alcohol and 53 parts of cis-1,4-dicyano-1-butene was added with stirring over a period of two hours while the reaction mixture was held at a temperature of 5-10° C. Stirring was continued for an additional 1¾ hours. The product was washed with water containing hydrochloric acid with the addition of a small amount of chloroform to aid in separation of the two layers. The excess allyl alcohol was removed from the reaction mixture under reduced pressure and the residue was distilled. Fifty-one parts of beta-allyloxyadiponitrile (63% yield) were obtained boiling at 105.5-112° C. at a pressure of 0.06 mm. of mercury. The product had a refractive index $n_D^{25}$ of 1.4606.

Analysis: Calculated for $C_9H_{14}ON_2$; C, 65.8; H, 7.3. Found: C, 65.34; H, 7.22.

Example VI

One-half part of sodium was dissolved in 54.5 parts of geraniol and 37.5 parts of cis-1,4-dicyano-1-butene was added dropwise over a period of two hours while the reaction mixture was kept at room temperature. The reaction mixture was neutralized with dilute hydrochloric acid, washed with water and distilled. The resulting beta-geranyloxyadiponitrile boiled at 165-176° C. at a pressure of 0.15 mm. of mercury and had a refractive index $n_D^{25}$ of 1.4740.

Analysis: Calculated for $C_{16}H_{24}ON_2$; C, 73.8; H, 9.24. Found: C, 73.5; H, 9.18.

Example VII

One-half part of sodium was dissolved in 130 parts of cyclohexanol by heating to 115° C. and 53 g. of 1,4-dicyano-2-butene was added at room temperature with stirring. After stirring for two hours, the reaction mixture was neutralized with glacial acetic acid and extracted with chloroform. The chloroform extracts were distilled. The beta-cyclohexyloxyadipontrile obtained had a boiling point of 130-144° C. at a pressure of 0.25-0.35 mm. of mercury and a refractive index $n_D^{25}$ of 1.4723.

Example VIII

One-half part of sodium was dissolved in 1000 parts of beta-ethoxyethanol and 400 parts of 1,4-dicyano-2-butene was added with stirring. After being stirred for several hours, the reaction mixture was held at room temperature for 24 hours. The excess beta-ethoxyethanol was then removed by distillation at reduced pressure. The residue was washed with 300 parts of water containing 10 parts of 1:1 hydrochloric acid and then washed with an additional 300 parts of water. The water layers were extracted with chloroform and the chloroform extracts added to the product layer. The chloroform was removed by distillation and the residue was dried with sodium sulfate and distilled. Five hundred and four parts of beta-ethoxyethoxyadiponitrile were obtained, boiling at 136–152° C. at a pressure of 0.2–1.0 mm. of mercury. The material had a refractive index $n_D^{25}$ of 1.4472. The yield was 74%, taking into account the recovery of 22.3 parts of dicyanobutene.

Analysis: Calculated for $C_{10}H_{16}O_2N_2$; C, 61.2; H, 8.15. Found: C, 61.0; H, 8.37.

The same product was obtained when the 1,4-dicyano-2-butene in the above example was replaced with cis-1,4-dicyano-1-butene.

Example IX

Two tenths parts of sodium was dissolved in 212 parts of methoxymethoxyethanol, $$CH_3OCH_2OCH_2CH_2OH$$

and 53 parts of 1,4-dicyano-2-butene was added with stirring at room temperature. After standing for 24 hours, the excess methoxymethoxyethanol was removed and after 200 parts of chloroform had been added, the organic layer was washed with water. The aqueous layer was extracted with 200 parts of chloroform and the combined chloroform extracts distilled. Sixty-seven and eight-tenths parts (64.4% yield) of beta-methoxymethoxyethoxyadiponitrile was obtained, boiling at 154–159° C. at a pressure of 0.27–0.4 mm. of mercury. The product had a refractive index $n_D^{25}$ of 1.4492.

Analysis: Calculated for $C_{10}H_{16}O_3N_2$; N, 27.8. Found: N, 27.58.

Example X

One part of sodium was dissolved in 432 parts of benzyl alcohol and 106 parts of 1,4-dicyano-2-butene was added at room temperature with stirring. The reaction mixture was allowed to stand for 16 hours, then made neutral with hydrochloric acid and washed twice with 200 parts of water. The organic layer was distilled and 182.7 parts of beta-benzyloxyadiponitrile (85% yield) was obtained having a boiling point 160–161° C. at 0.15 mm. pressure. The product had a refractive index $n_D^{25}$ of 1.5153.

Analysis: Calculated for $C_{13}H_{14}ON_2$; C, 72.9; H, 6.57; N, 13.1. Found: C, 73.0; H, 6.61; N, 12.84.

Example XI

A solution of 100 parts of 1,4-dicyano-2-butene and 2 parts of powdered ammonium carbonate in 400 parts of methanol was refluxed under nitrogen atmosphere for 20 hours. The excess methanol was removed in a stripping still and the residual liquid was distilled through a fractionating column. Upon redistillation there was obtained 21 parts of material boiling at 89–92° C. at 0.4 mm. pressure, refractive index $n_D^{25}$ 1.4656, and 45 parts of material boiling at 112–116° C. at 0.4 mm. pressure, refractive index $n_D^{25}$ 1.4453, together with an intermediate fraction. The lower boiling material, which contained 25.49% nitrogen, was 1,4-dicyano-1-butene, produced by isomerization of 1,4-dicyano-2-butene. The higher boiling material was beta-methoxyadiponitrile, as shown by its nitrogen content of 19.89% (calculated: 20.28%).

Example XII

Alcohols also add to dicyanobutene under the influence of certain chelate compounds such as copper acetylacetonate, as shown by the following experiment.

A solution of 100 parts of 1,4-dicyano-2-butene and 2 parts of copper acetylacetonate in 400 parts of methanol was heated under reflux in a nitrogen atmosphere for 16 hours. The originally blue-green solution turned brown, then almost black during this time and a small deposit of insoluble sludge formed on the walls of the vessel. The reaction product was filtered and the methanol was distilled off in a stripping still. The residual dark oil was distilled through a fractionating column. This gave about 40 parts of a fraction boiling at 79–81° C. at 0.5 mm. pressure and about 55 parts of a fraction boiling at 134–137° C. at 0.5 mm. pressure. The lower boiling fraction had the composition $C_7H_{10}ON_2$ and it was apparently a heterocyclic compound, probably 5 - cyanomethyl - 2 - methoxy - 1-pyrroline. The higher boiling fraction on redistillation boiled at 104–109° C. at 0.35 mm. pressure and had a refractive index $n_D^{25}$ of 1.4444. It also had the composition $C_7H_{10}ON_2$, as shown by the following analytical data: C, 61.54%; H, 7.30%; N, 20.10%, as compared with the calculated values: C, 60.9%; H, 7.25%; N, 20.3%. This together with the physical properties indicated that this compound was beta-methoxyadiponitrile.

This invention includes as new products the ethers of beta-hydroxyadiponitrile with any alcohol wherein the alcoholic hydroxyl is attached to a carbon atom which is aliphatic, i. e., non-aromatic in character. Thus there are included beta - alkoxyadiponitriles, beta - alkoxyalkoxyadiponitriles, beta - alkoxyalkoxyalkoxyadiponitriles, beta-alkenyloxyadiponitriles, beta-aralkoxyadiponitriles, beta-aralkenyloxyadiponitriles and beta-cycloalkoxyadiponitriles. In addition to the ethers of the examples, there may be mentioned as coming within this class of new compounds beta-isopropoxyadiponitrile, beta-sec. butoxyadiponitrile, beta-tert. butoxyadiponitrile, beta-n-octyloxyadiponitrile, beta-dodecyloxyadiponitrile, beta - crotonyloxyadiponitrile, beta-cinnamyloxyadiponitrile, beta-phenylethyloxyadiponitrile, beta-cyclopentyloxyadiponitrile, beta-furfuryloxyadiponitrile and the like. The preferred materials are the ethers derived from primary and secondary monohydric alcohols which, apart from the hydroxyl groups, are hydrocarbon or ether-substituted hydrocarbons. The most accessible of these ethers are those derived from alcohols containing between 1 and 12 carbon atoms, particularly the beta-alkoxyadiponitriles.

The ethers of beta-hydroxyadiponitriles are useful as intermediates in the preparation of the corresponding amines, acids, amides, etc. They are also useful per se, for example, as insecticides, fumigants, plasticizers or solvents.

As many apparently widely different embodiments of this invention may be made without departing from the spirit and scope thereof, it is to be understood that this invention is not limited to the specific embodiments thereof except as defined in the appended claims.

I claim:

1. Beta-methoxyadiponitrile.
2. An ether of beta-hydroxyadiponitrile having the formula $$\text{NC—CH}_2\text{—CH—CH}_2\text{—CH}_2\text{—CN}$$
$$|$$
$$\text{OR}$$

wherein R is the non-hydroxyl portion of an alcohol and is selected from the group consisting of hydrocarbon of from 1 to 12 carbon atoms and of ether-substituted hydrocarbon of not more than 12 carbon atoms.

3. An aliphatic ether of beta-hydroxyadiponitrile having the formula

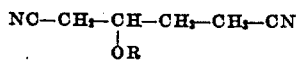

wherein R is the non-hydroxyl portion of an aliphatic alcohol and consists of ether-substituted aliphatic hydrocarbon of not more than 12 carbon atoms.

4. An ether of beta-hydroxyadiponitrile having the formula

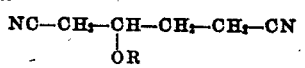

wherein R is the non-hydroxyl portion of an alcohol and consists of hydrocarbon of from 1 to 12 carbon atoms.

5. An aliphatic ether of beta-hydroxyadiponitrile having the formula

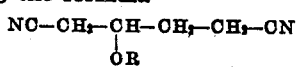

wherein R is the non-hydroxyl portion of an aliphatic alcohol and consists of aliphatic hydrocarbon of from 1 to 12 aliphatic carbon atoms.

6. A beta-alkoxyadiponitrile in which the alkoxy group contains from 1 to 12 carbon atoms.

GLENN F. HAGER.

REFERENCES CITED

The following references are of record in the file of this patent:

UNITED STATES PATENTS

| Number | Name | Date |
|---|---|---|
| 2,144,340 | Lazier | Jan. 17, 1939 |

OTHER REFERENCES

Farmer, J. Chem. Soc. (London), vol. 123, pp. 3327–3330 (1910).

Beilstein (Handbush, 4th ed., 2nd Suppl. 1942), p. 210.